Aug. 12, 1924.
H. S. JANDUS
1,505,027
BUMPER
Filed Nov. 23, 1922
2 Sheets-Sheet 1
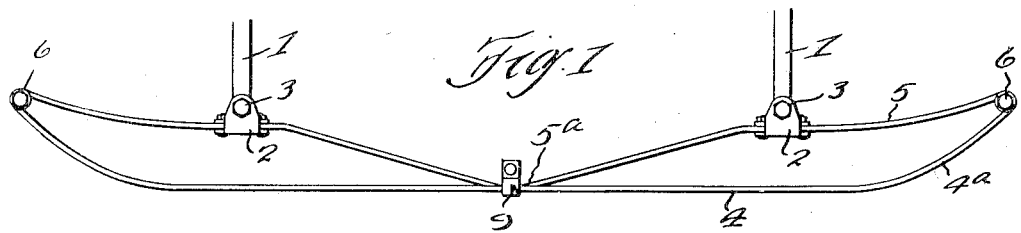
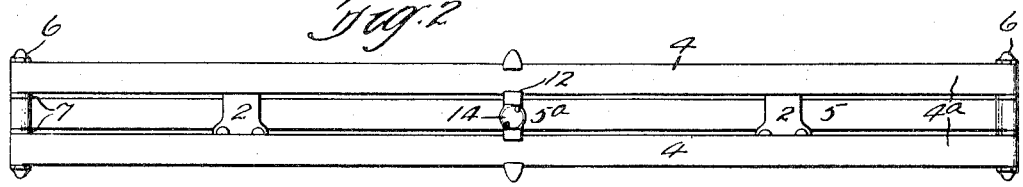
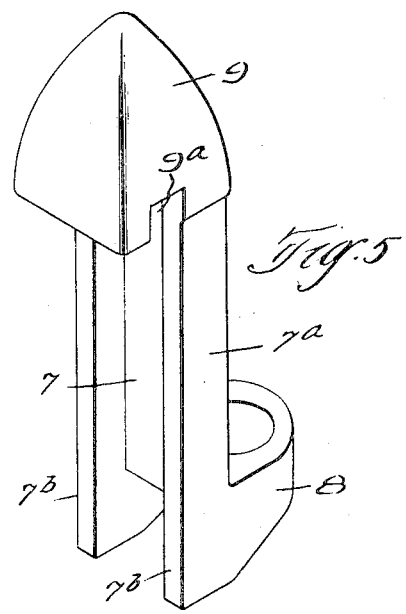
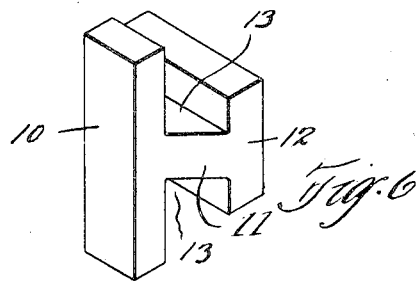
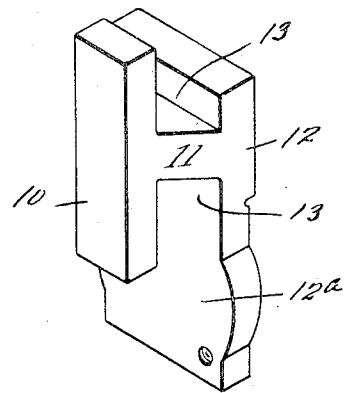
Inventor
Herbert S. Jandus,
By
Hull, Brock West.
Attys.

Aug. 12, 1924.
H. S. JANDUS
BUMPER
Filed Nov. 23, 1922
1,505,027
2 Sheets-Sheet 2
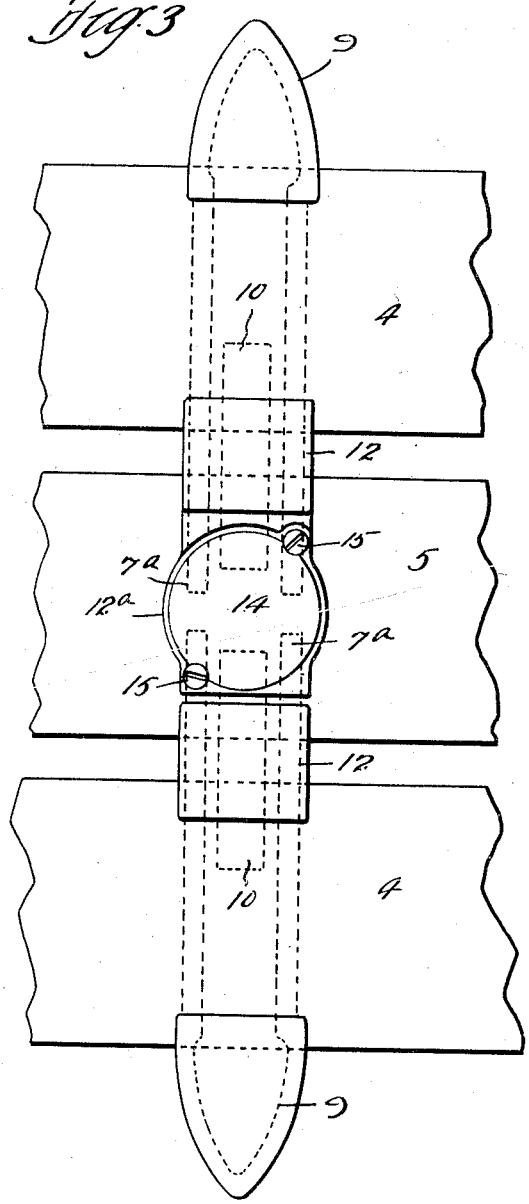
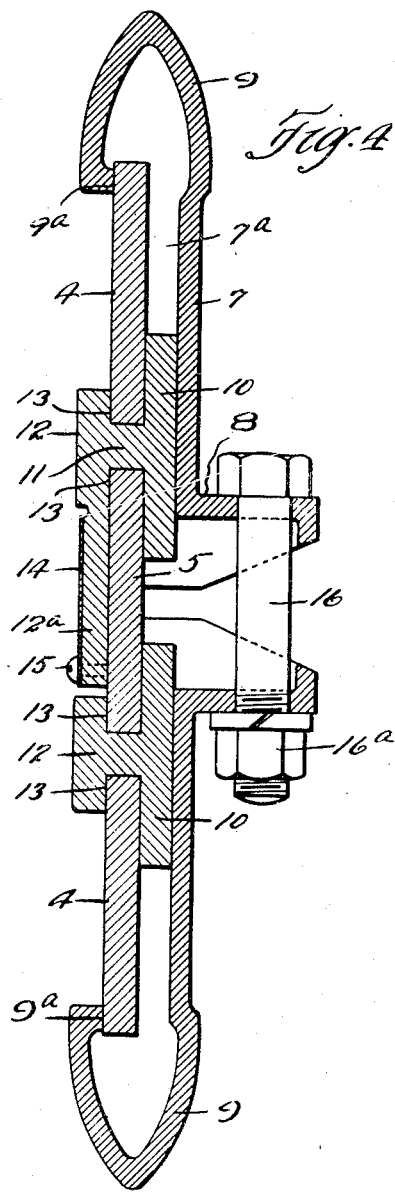
Inventor
Herbert S. Jandus
By Hull, Brock & West
Attys.

Patented Aug. 12, 1924.

1,505,027

UNITED STATES PATENT OFFICE.

HERBERT S. JANDUS, OF KALAMAZOO, MICHIGAN, ASSIGNOR TO THE C. G. SPRING & BUMPER COMPANY, OF DETROIT, MICHIGAN, A CORPORATION OF DELAWARE.

BUMPER.

Application filed November 23, 1922. Serial No. 602,727.

*To all whom it may concern:*

Be it known that I, HERBERT S. JANDUS, a citizen of the United States, residing at Kalamazoo, in the county of Kalamazoo and State of Michigan, have invented a certain new and useful Improvement in Bumpers, of which the following is a full, clear, and exact description, reference being had to the accompanying drawings.

This invention relates to automobile bumpers, and more particularly to bumpers comprising a plurality of substantially parallel impact bars; and more limitedly to a bumper of this type having a rear or auxiliary bar connected at its ends to the impact bars and having its central portion projected toward and connected to the central portions of the impact bars.

It is the general purpose and object of the invention to improve and simplify, in bumpers of this type, the means for connecting the central portions of the bars. I accomplish the foregoing objects in and through the construction and arrangement of parts illustrated in the drawings hereof, wherein Fig. 1 represents a plan view of a bumper of the character referred to, having my invention applied thereto, the bumper being shown as attached to its supporting arms; Fig. 2 a front elevation of the bumper shown in the preceding view; Fig. 3 an enlarged detail in front elevation, and Fig. 4 a similar detail in sectional elevation, of the central portion of the bumper and the means for connecting the parts thereof; while Figs. 5 and 6 are details in perspective of the clamping and spacing members.

Describing the various parts by reference characters, 1 denotes a pair of supporting arms or brackets by means of which the bumper is supported, preferably through clamps 2 adjustably mounted upon the rear or auxiliary bar of the bumper and pivotally connected to the ends of the members 1, as indicated at 3.

The bumper shown herein comprises generally a pair of parallel vertically spaced front or impact bars 4 extending the full width of the bumper and a rear or auxiliary bar 5 also extending the full width of the bumper and connected at its ends to and between the ends of the bars 4 and at its center to and between the central portions of the said bars 4. The ends of the bars 4 are curved rearwardly, as shown at 4ª, and the end portions of the bar 5 are also curved rearwardly, to form a loop at each end of the bumper between the ends of the bars 4 and 5. The extreme ends of the bars are connected by means of bolts that extend through aligned eyes formed on the plates 4 and 5, there being washers 7 interposed between such eyes.

The clamps 2 are adjustably mounted upon the end portions of the auxiliary bar 5, while the central portion of the auxiliary plate (between the clamp-supporting portions) is bent into V-shape, with its central portion 5ª projected between the central portions of the bars 4.

The bars 4 and 5 are preferably of the flat-plate type, such as used in the manufacture of springs, although round, square, or angular stock may be employed for this purpose. The central portions of these bars are connected by the combined clamping and spacing means shown in detail in Figs. 3 to 6, inclusive.

The complete clamping and spacing device comprises a pair of L-shaped members adapted to be applied to the top of the upper, and the bottom of the lower bar 4, respectively, and to be adjusted toward and from each other; together with a pair of combined spacing and engaging members interposed between the first two members and which jointly receive the bottom of the top bar and the top of the auxiliary bar, and the top of the bottom bar and the bottom of the auxiliary bar, respectively, and which are caused to engage and clamp the said bars through the clamping movement of the first two members.

Each of the first two members is generally L-shaped, the members being symmetrical and reversible, permitting them to be used interchangeably for the top and the bottom of the clamping assembly. Each of the said members comprises a vertical channel shaped stem or post, indicated generally at 7, the flanges 7ª of the channel being presented rearwardly, or toward the vehicle, and forming at their rear edges 7ᵇ bearings adapted to engage a portion of the front or outer face of the intermediate bar 5 and the full width of the front or outer face of the bar 4 with which they respectively cooperate. Projecting outwardly, or forwardly, from the lower end of the channeled post 7 is a bracket 8 having an aperture therethrough for the reception of a bolt 9. At the end of each of the said clamping members which is opposite the bracket, there is an ornamental cap 9 which projects inwardly or rearwardly beyond the flanges 7ª and has formed therein the upwardly and downwardly extending seating notches 9ª, adapted to receive the upper and the lower edge of a plate 4 and to form a seat therefor, the outer or front face of each notch 9ª constituting an extension of the seating edge of a flange 7ª. Cooperating with the members 7—9 are the intermediate spacing and clamping members. These members are identical in function and are substantially identical in construction; each comprises a base 10 which is adapted to be received within the channel 7, 7ª of its cooperating clamping member, the said bases being each connected with a head 12 by an intermediate web 11. The thickness of each base 10 is substantially equal to the depth of the channel in which it is fitted. The two members 10—12, just described, are provided each with a pair of channeled seats 13, formed above and below the web 11, respectively, one seat of each of these members receiving the cooperating edge of its plate 4 and the other seat the cooperating edge of the auxiliary plate 5. One of the members is shown as provided with an extension 12ª of the head 12, which extension is of such extent and shape as to form a support for a name plate 14, which may be conveniently attached to the said extension, as by screws 15. The bolt by which the clamping members 7—9ª inclusive are adjusted toward each other is indicated at 16.

In securing the bars or plates 4 and 5 together, the intermediate clamping and spacing members are applied to and between the plates before the latter are connected at their ends by the bolts 6 and are aligned at the central portion of the bumper. The members 7—9ª are applied to the plates in the manner shown in the drawing, with the channel 7, 7ª presented rearwardly or toward the vehicle. The bolt 16 is inserted in the aligned openings in the brackets 8 and the nut 16ª is set up. By setting up the nut, the upper and lower edges of the upper and lower plates 4 are received snugly within the seats provided therefor in the members 7—9 while their opposite edges are forced firmly into the channeled seats provided therefor in the intermediate members 10—13. This also causes the top and the bottom edges of the auxiliary plate 5 to be firmly clamped within the seats provided therefor in the intermediate blocks or members, the webs or necks 11 serving to space the plates accurately.

The clamping device constituted by the foregoing parts is comparatively simple and inexpensive of production and retains the bars or plates firmly in place and without rattling. The front or outer face of each main plate 4 is engaged throughout its full width by the edges of the flanges 7ª and for a part of its width by a base 10. The rear or inner face of each main plate is engaged by the rear or inner walls of the notches 9ª and by a portion of a head 12. The front or outer face of the intermediate plate 5 is engaged by the edges of the flanges 7ª of both the main clamping members and by the adjacent portions of the bases 10 of the intermediate members, while the rear or inner face of the said plate is engaged by the adjacent portions of the heads 12, 12ª. The plates are thus clamped together by members having an extended bearing thereupon and firmly engaging the same. Furthermore, the device is highly ornamental and is readily assembled and disassembled.

Having thus described my invention, what I claim is:

1. A clamping device for securing together an upper and a lower bar and an intermediate bar, said device comprising a pair of upper and lower symmetrical members each adapted to engage the upper edge of the uppermost bar and the lower edge of the lowermost bar, a pair of symmetrical intermediate members each having oppositely facing seats adapted to receive respectively the lower edge of the uppermost bar or plate and the upper edge of the intermediate bar or plate, and the upper edge of the lowermost bar or plate and the lower edge of the intermediate bar or plate, and means connected with the first two members for adjusting the same toward each other.

2. A clamping device for securing together an upper and a lower bar and an intermediate bar, said device comprising an upper and a lower member adapted respectively to engage the upper edge of the uppermost bar and the lower edge of the lowermost bar, a pair of intermediate members each having oppositely facing seats adapted to receive respectively an edge of the intermediate bar and the adjacent edge of another bar, and means for adjusting the first two members toward each other.

3. A clamping device for securing together an upper and a lower main bar and an intermediate auxiliary bar, the said device comprising a pair of relatively movable members each having a recessed seat, the said seats being adapted to receive respectively the upper edge of the uppermost bar and the lower edge of the lowermost bar and each having a channel the flanges whereof are adapted to engage respectively the adjacent lateral faces of the uppermost and lowermost bars, a pair of intermediate clamping members each having a portion adapted to be received within the channel of one of the first mentioned members and each having formed therein opposed seats adapted to receive respectively an edge of the intermediate bar and an edge of a main bar, and means for adjusting the first two mentioned members toward each other.

4. A clamping device for securing together an upper and a lower main bar and an intermediate auxiliary bar, the said device comprising a pair of relatively movable members each having a recessed seat, the said seats being adapted to receive respectively the upper edge of the uppermost bar and the lower edge of the lowermost bar, a pair of intermediate clamping members each having a portion adapted to slidingly engage one of the first mentioned members and each having formed therein opposed seats adapted to receive respectively an edge of the intermediate bar and an edge of a main bar, and means for adjusting the first two mentioned members toward each other.

5. A clamping device for securing together an upper and a lower main bar and an intermediate auxiliary bar, said clamping device comprising a pair of symmetrical clamping members each having a seat therein adapted to receive the upper edge of the uppermost bar and the lower edge of lowermost bar and provided each with a channel the edges of the flanges whereof are adapted to engage the adjacent lateral faces of the said main bars, each of the said clamping members also having a bracket projecting laterally therefrom, a pair of intermediate members each having a base portion adapted to be slidably mounted in the channel of one of the first mentioned members and each having opposed recesses forming channeled seats for the reception of an edge of the auxiliary plate and the edge of an adjacent main plate, and a bolt adjustably connecting the said brackets.

6. A clamping device for securing together an upper and a lower main bar and an intermediate auxiliary bar, said clamping device comprising an upper and a lower clamping member each having a seat therein adapted to receive respectively the upper edge of the uppermost bar and the lower edge of lowermost bar, each of said clamping members also having a bracket projecting laterally therefrom, a pair of intermediate members each having opposed recesses forming channeled seats for the reception of an edge of the auxiliary plate and the edge of an adjacent main plate, and means adjustably connecting the said brackets.

7. The combination, with the upper and lower main bars and the intermediate bar of a bumper, of means for connecting the said bars in substantially vertical alignment, the said means comprising an upper and a lower clamping member having respectively a seat for the upper edge of the upper main bar and for the lower edge of the lower main bar, a pair of intermediate spacing and clamping members each having a pair of vertically spaced seats for an edge of the intermediate bar and the adjacent edge of a main bar, respectively, and means for moving the first mentioned members toward each other.

8. The combination, with the upper and lower main bars and the intermediate plate of a bumper, of means for connecting the said bars in substantially vertical alignment, the said means comprising an upper and a lower clamping member having respectively a seat for the upper edge of the upper main bar and for the lower edge of the lower main bar and a bearing surface for a lateral face of a main bar and the adjacent portion of the lateral face of the intermediate bar, a pair of intermediate spacing and clamping members each having a pair of seats for an edge of the intermediate bar and the adjacent edge of a main bar or plate and each having bearing surfaces adapted to engage both lateral faces of the intermediate bar and of a main bar adjacent thereto, and means for moving the first two members toward each other.

9. The combination, with the upper and lower main bars and the intermediate bar of a bumper, of means for clamping the same in spaced vertical alignment, said means comprising an upper and a lower clamping member, each having a recessed seat for application to the upper edge of the uppermost bar and the lower edge of the lowermost bar, respectively, a pair of intermediate members each having a seat for an edge of the intermediate bar and the adjacent edge of a main bar, one of the last mentioned members having an extended head adapted to overlap the intermediate bar and to provide a support for a name plate, and means adjustably connecting the two first mentioned members.

10. The combination, with the upper and lower main bars and the intermediate bar of a bumper, of means for clamping the same in spaced vertical alignment, said means comprising an upper and a lower clamping member each having a recessed seat for application to the upper edge of the uppermost bar and the lower edge of the lowermost bar, respectively, a pair of intermediate members each having a seat for an edge of the intermediate plate and the adjacent edge of a main plate, the said upper and lower clamping members each having bearing surfaces adapted to engage opposite faces of their respective main bars and the portion of the front or outer face of the intermediate bar which is adjacent thereto and each of the said intermediate members having bearing surfaces adapted to engage opposite faces of the intermediate bar and of the main bar adjacent thereto, and means for moving the first two clamping members toward each other.

In testimony whereof, I hereunto affix my signature.

HERBERT S. JANDUS.